US006396784B1

(12) United States Patent
Wang et al.

(10) Patent No.: US 6,396,784 B1
(45) Date of Patent: May 28, 2002

(54) AUDIO COMPACT DISC TITLE WITH A RELATIVELY HIGH DENSITY FORMAT

(75) Inventors: Hung-Min Wang; Chung-Ying Chen; Wen-Hsin Wang, all of Hsinchu (TW)

(73) Assignee: Winbond Electronics Corp. (TW)

( * ) Notice: Subject to any disclaimer, the term of this patent is extended or adjusted under 35 U.S.C. 154(b) by 0 days.

(21) Appl. No.: 09/292,898

(22) Filed: Apr. 16, 1999

(30) Foreign Application Priority Data

May 22, 1998 (TW) .......................................... 87208061

(51) Int. Cl.$^7$ ............................... G11B 3/90; G11B 7/24
(52) U.S. Cl. ................. 369/53.2; 369/275.3; 369/59.23
(58) Field of Search ........................... 369/47.28, 47.31, 369/47.43, 47.54, 94, 32, 59.25, 59.23, 59.26, 53.2, 53.22, 53.24, 47.16, 47.22, 275.3; 386/94, 96

(56) References Cited

U.S. PATENT DOCUMENTS 5,737,287 A * 4/1998 Lee
6,016,295 A * 1/2000 Endoh et al.
6,111,845 A * 8/2000 Shyu

* cited by examiner

*Primary Examiner*—Thang V. Tran
(74) *Attorney, Agent, or Firm*—Peter F. Corless; Steven M. Jensen; Edwards & Angell, LLP

(57) ABSTRACT

An audio compact disc title with a high density format adapted to be used in a compact disc player is disclosed. The audio compact disc title includes a plurality of tracks, each of the tracks has a plurality of audio sectors for storing audio data, wherein the audio data are divided into a plurality of audio signals alternately stored in the audio sectors, and a compact disc identifying code for representing the relatively high density format of the audio compact disc title for the compact disc player. A method for recording audio data in an audio compact disc title with a high density format is also disclosed. The method includes steps of dividing the audio data into a plurality of audio signals, rearranging the plurality of audio signals to space any two continuous audio signals by other audio signals, and recording the rearranged audio signals in the audio compact disc title.

9 Claims, 4 Drawing Sheets

AUDIO COMPACT DISC TITLE WITH A RELATIVELY HIGH DENSITY FORMAT

FIELD OF THE INVENTION

The present invention is related to an audio compact disc title adapted to be used in a compact disc player and a method for recording audio data in an audio compact disc title, and more particularly to an audio compact disc title with a high density format adapted to be used in a compact disc player and a method for recording audio data in an audio compact disc title with a high density format.

BACKGROUND OF THE INVENTION

At the present time, a general compact disc player has many types. In order to increase the time for playing compact disc titles, many manufacturers attempted to produce a compact disc player for holding three or five compact disc titles to solve the troubles in changing compact disc title frequently. However, such a compact disc player for holding three or five compact disc titles is usually expensive.

A general audio compact disc title ( a title of compact disc digital audio (CD-DA)) is manufactured according to the specification of Philips company. An audio compact disc title with a diameter of 12 cm can only save a plurality of songs in the time length of 60 minutes. A general video compact disc (VCD) title has the same storage space as that of the CD-DA title, but the audio and video signals of VCD title are encoded in an MPEG 1 compressing form. If the quality of the pictures played from the VCD title is similar to that of a VHS type and the quality of sounds played from the VCD title is the same as that of a general audio compact disc title, the video compact disc title can save songs with a time length of 74 minutes. Namely, although the audio signals are compressed in MPEG 1 format in VCD title, the total time for boardcasting the music is not increased significantly, because compressed video data are also added into the VCD title. Hence, if the video signals stored in the VCD title can be replaced by the audio signals, the capacity for storing audio signals may be significantly increased many times.

Please refer to FIG. 1 showing an example of MPEG audio and video interleaving according to the Video CD Specification version 2.0 (Philips Consumer Electronics B.V. July 1994). In accordance with Video CD Specification version 2.0, the video signals 11 and audio signals 12 are interleaving stored in the sectors 1 of the video compact disc title in order to show the pictures and sound corresponding to the video and audio signals at the same time. As shown in FIG. 1, if the video signals can be replaced by the audio signals, the capacity for storing audio signals may be significantly increased many times.

Although the Video CD Specification version 2.0 has disclosed a compact disc title format for only recording audio signals therein, such a compact disc title just only stores a plurality of dummy codes instead of the video signals for keeping a constant decompressing rate of a compact disc player. Namely, it does not increase the capacity for storing audio signals in the compact disc title. When the decoder of the compact disc player decodes, both the audio signals and dummy codes are transmitted to the decoder. However, the decoder can only decode the audio signals. This is the reason why the audio signals is encoded in an MPEG 1 Layer II form in accordance with the Video CD Specification version 2.0. When the sampling frequency is 44.1 kHz, the decompressing rate of a compact disc player could be 224 KBit/Sec. If all video signals are replaced by the audio signals, the audio signals picked tip by the pick-up head per second must be more than that decompressed by a decoder of the compact disc player. In this situation, there is no enough buffer in the compact disc-player for temporarily storing the excessive audio signals. Hence, the dummy codes must be added in the compact disc title in order to adjust the decompressing rate of a compact disc player in the range of 224 KBit/Sec for enabling the decoder of compact disc player to decode normally. Namely, to replace the video signals by a plurality of dummy codes in a general video compact disc title can not increase the capacity of a compact disc title for storing audio signals.

In another case of the implementation, the rate of picking up the audio signals by the pick-up head can be controlled at rates required. However, there still exist some restrictions in the hardware stricture. When there is only audio signals, corresponding to a song, stored in a track, the compact disc player must adjust the pick-up rate of the audio signals in order to keep a constant decompressing rate of the compact disc player at 224 KBit/Sec. Namely, the pick-tip head must randomly access the signals on and off. However, the pick-up head of the compact disc player picks tip the audio signals stored in the sectors at a constantly linear velocity. The size of the sectors in different tracks are all the same. The advantages of the constant linear velocity is that it can keep a constant velocity for the pick-up head to pick tip audio signals, but this may bring about some troubles in random access. Because the pick-up head of the compact disc player needs to search a sector it required, the compact disc player must move the pick-up head to the required position, adjust the velocity of searching the required track, and then search the required sector. This is why the seeking time for the compact disc player is so long. A general compact disc player usually provides a single-rate compact disc drive in order to save the costs, so the seeking time of the pick-up head is too long to control the rate of picking up signals in a required range for the MPEG decoder. Hence, it is desirable to improve tile problems encountered with a general compact disc title.

SUMMARY OF THE INVENTION

It is therefore a primary object of the present invention to provide an audio compact disc title with a high density format adapted to be used in a compact disc player. To provide such a compact disc title with a high density format can not only increase the capacity for storing audio signals but also eliminate the troubles of changing the compact disc title frequently. Furthermore, there is no need to buy a compact disc player with three or five disc loader.

The audio compact disc title with a high density format includes a plurality of tracks, said tracks have a plurality of audio sectors for storing audio data, wherein the audio data are divided into a plurality of audio signals alternately stored in the audio sectors. According to the present invention, the video signals can be replaced by the audio signals, the capacity for storing audio signals may be significantly increased many times. Moreover, when the compact disc player reads a specific one of the audio signals, other audio signals will be regarded as dummy codes to keep a constant decompressing rate of the compact disc player. Hence, the audio compact disc title with a high density format can increase the capacity for storing audio signals and eliminate the troubles of changing the compact disc frequently.

In addition, there is a compact disc identifying code stored in the audio compact disc title for representing the relatively high density format of the audio compact disc title to be read by the compact disc player. The microprocessor of the compact disc player will drive the pick-up head to read the compact disc identifying code stored in the audio compact disc title. If a character string representing an audio compact disc title with a high density format is read, the microprocessor will execute a required sub-program.

In accordance with one aspect of the present invention, the audio data is encoded in an MPEG 1 audio compressing from. The audio data includes a plurality of songs, each of which has a corresponding song identifying code for representing each song.

Preferably, each of the plurality of tracks includes the plurality of audio sectors, specific adjacent ones of which respectively store therein audio signals of the same sequence order of the songs. In accordance with another aspect of the present invention, each of the plurality of tracks includes the plurality of sectors, respective ones of which respectively store therein audio signals of a specific song.

The compact disc identifying code is a 8-byte code stored in a system identification column of an INFO.VCD file in the audio compact disc title. The song identifying code is stored in a $stream_{13}$ id of the audio compact disc title. The $stream_{13}$ id is composed of a 8-bit code so that a maximum number of the song identifying codes is 255. The song identifying code is stored in respective sectors. The audio signals stored in the audio sector have the same compression ratio. There is a plurality of audio dummy codes stored in specific audio sectors for maintaining a constant reading rate of the compact disc player.

Another object of the present invention is to provide an audio compact disc title with a high density format adapted to be used in a compact disc player. The audio compact disc title includes a plurality of tracks, each of the tracks has a plurality of audio sectors for storing audio data, wherein the audio data are divided into a plurality of audio signals. The compact disc player reads a specific one of the audio signals while regarding other audio signals as dummy codes. The plurality of audio signals are alternately stored in the audio sectors. The audio data includes a plurality of songs, each of which has a corresponding song identifying code for representing each song.

Still another object of the present invention is to provide a method for recording audio data in an audio compact disc title with a high density format. The method includes steps of dividing the audio data into a plurality of audio signals, rearranging the plurality of audio signals to space any two continuous audio signals by other audio signals, and recording the rearranged audio signals in the audio compact disc title.

Before recording the rear-angled audio signals, the method further includes steps of recording a compact disc identifying code in the audio compact disc title for representing the relatively high density format of the compact disc title to be read by a compact disc player, and recording a plurality of song identifying codes, each of which represents a song. After rearranging the audio signals, the method further includes a step of inserting a plurality of dummy codes among the audio signals.

The present invention may best be understood through the following description with reference to the accompanying drawings, in which:

DETAILED DESCRIPTION OF THE PREFERRED EMBODIMENTS

Figure 1:
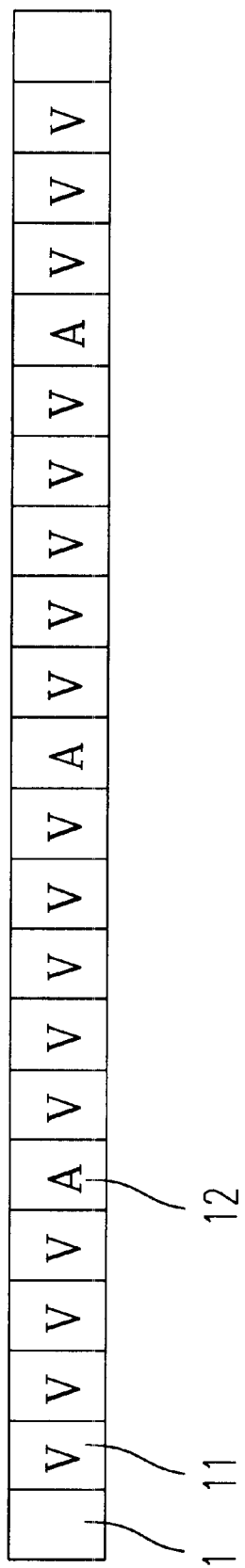
FIG. 1 is a schematic diagram showing an example of MPEG audio and video interleaving according to the Video CD Specification version 2.0 (Philips Consumer Electronics B.V. July 1994)
Figure 2:
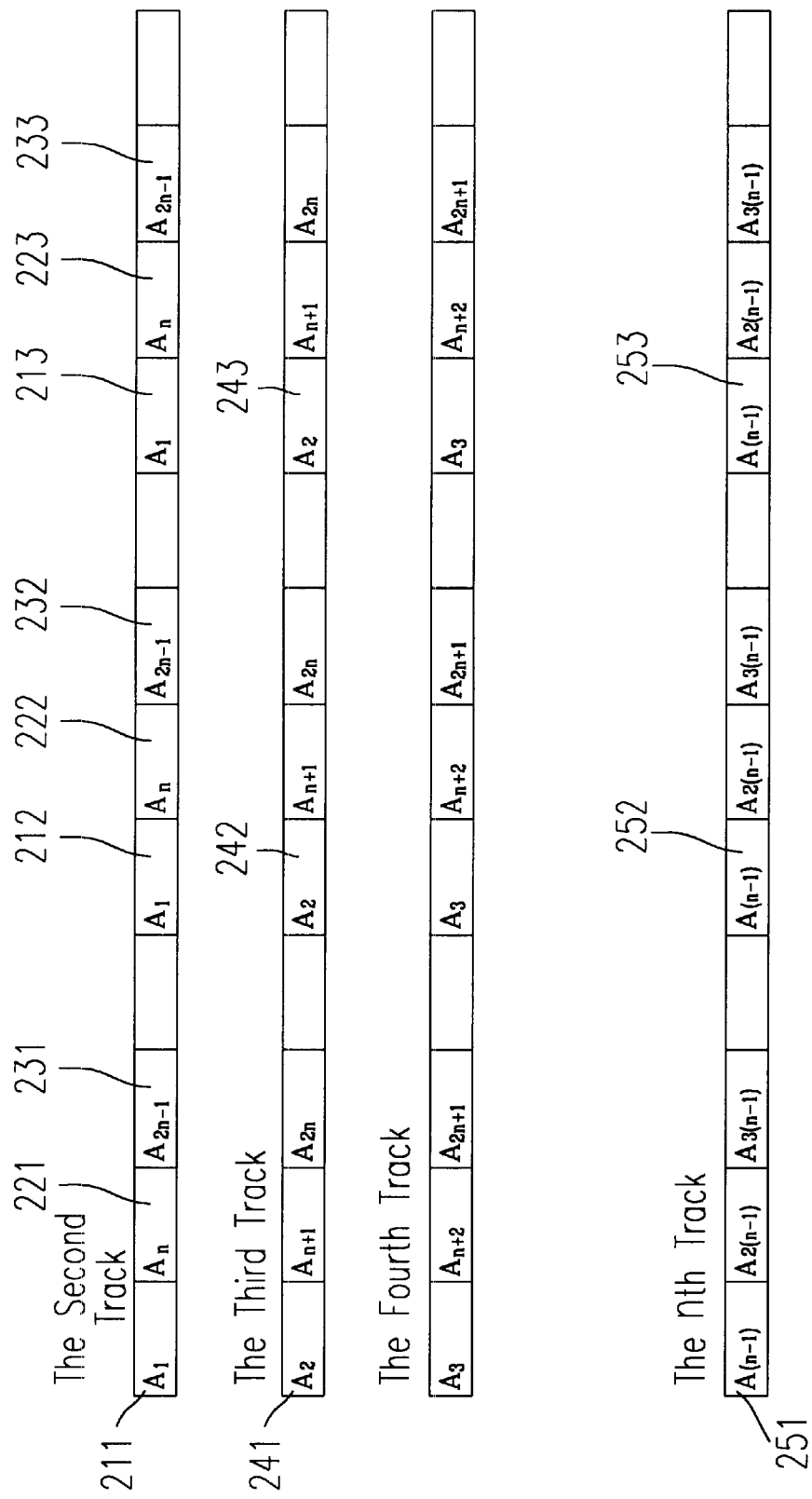
FIG. 2 is a schematic diagram showing a first preferred embodiment of an audio compact disc title with a high density format according to the present invention.

Please refer to FIG. 2 showing a first preferred embodiment of an audio compact disc title with a high density format. As shown in FIG. 2, the audio compact disc title with a high density format includes a plurality of tracks, each of the tracks has a plurality of audio sectors for storing audio data. The first song can be converted to audio data, which are divided into a plurality of audio signals A1 alternately stored in the audio sectors (211, 212, 213 . . . ) of the second track. There are also a plurality of audio signals A2 corresponding to a second song alternately stored in the audio sectors (241, 242, 243 . . . ) of the third track. There are still another plurality of audio signals A(n−1) corresponding to a (n−1)th song alternately stored in the audio sectors (251, 252, 253 . . . ) of the nth track. There are a plurality of audio signals $A_n$ corresponding to the nth song alternately stored in the audio sectors (221, 222, 223 . . . ) of the first track. Therefore, it should be understood that each of the plurality of tracks includes the plurality of audio sectors, specific adjacent ones of which respectively stores therein audio signals of the same sequence order of the songs.

The audio data corresponding to a plurality of songs is encoded in an MPEG 1 audio compressing form. The audio signals stored in the audio sectors have the same compressing ratio. When the compact disc player reads a specific one of the audio signals, other audio signals will be regarded as dummy codes. Certainly, if there are still some free sectors after all audio signals are stored in required audio sectors of a track, a plurality of audio dummy codes can be added to the specific audio sectors for maintaining a constant decompressing rate of a compact disc player.

There is a compact disc identifying code for representing the relatively high density format of the audio compact disc title to be read by a compact disc player. The compact disc identifying code is a 8-byte code stored in a system identification column of an INFO.VCD file in the first track of the audio compact disc title.

The audio data includes a plurality of songs, each of which has a corresponding song identifying code for representing each song. The song identifying code is stored in a $stream_{13}$ id of respective sectors. The $stream_{13}$ id is composed of an 8-bit code so that a maximum number of the song identifying codes is 255.

Figure 3:
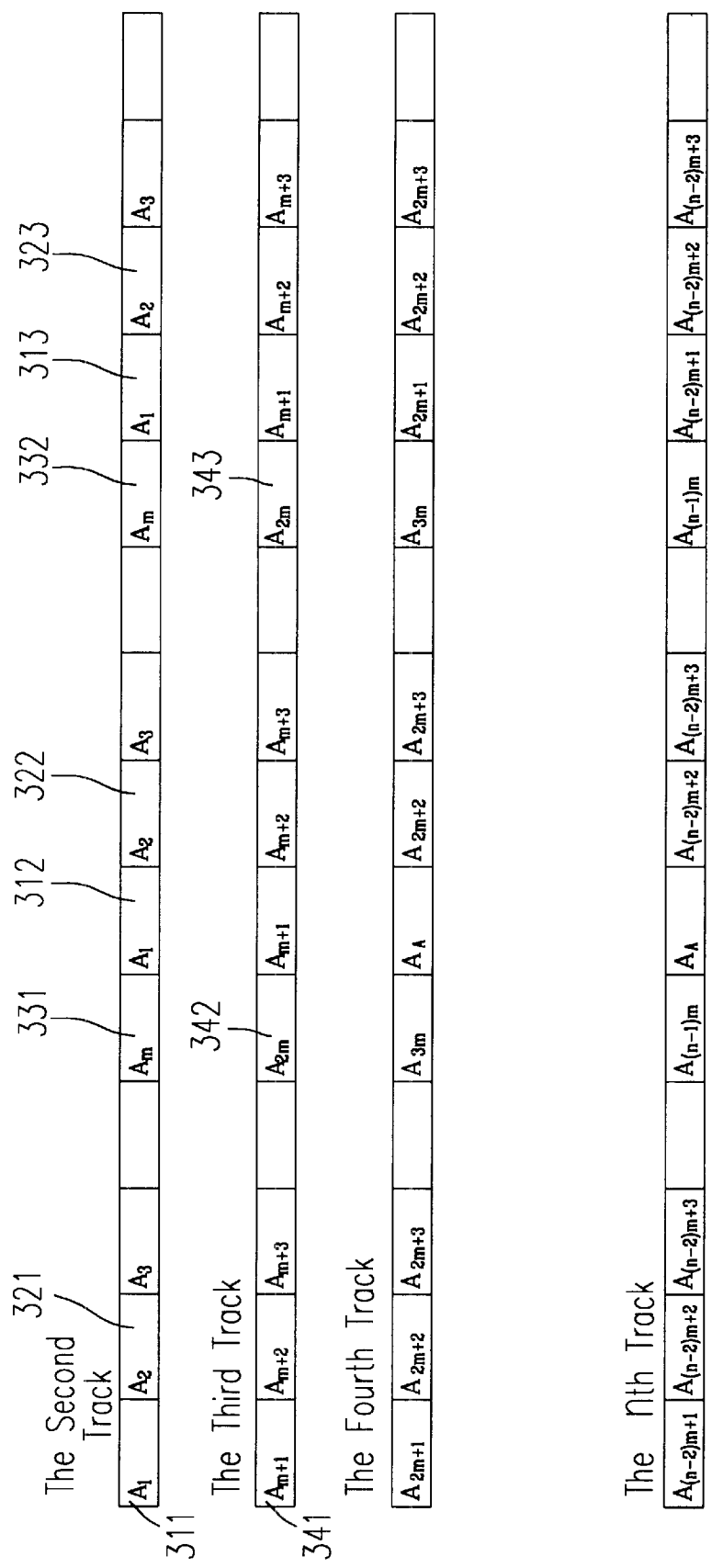
FIG. 3 is a schematic diagram showing a second preferred embodiment of the audio compact disc title with a high format according to the present invention.

Please refer to FIG. 3 showing a second preferred embodiment of the audio compact disc title with a high density format. As shown in FIG. 3, the audio compact disc title with a high density format includes a plurality of tracks, each of which has a plurality of audio sectors for storing audio data. The first song can be converted to audio data, wherein the audio data are divided into a plurality of audio signals A1 alternately stored in the audio sectors (311, 312, 313 . . . ) of the second track. There are also a plurality of audio signals A2 corresponding to a second song to be alternately stored in the audio sectors (321, 322, 323 . . . ) of the second track. There are still another plurality of audio signals corresponding to a mth song to be alternately stored in the audio sectors (331, 332 . . . ) of the second track. There are a plurality of audio signals A(m+1) corresponding to a (m+1)th song to be alternately stored in the audio sectors (341, 342, 343 . . . ) of the third track. It should be understood that each of the plurality of tracks includes the plurality of sectors, respective ones of which respectively store therein audio signals of a specific song.

Therefore, the method for recording audio data in an audio compact disc title with a high density format includes the steps of:

(a) dividing the audio data corresponding to a plurality of songs into a plurality of audio signals;

(b) rearranging the plurality of audio signals to space any two continuous audio signals by other audio signals; and (c) recording the rearranged audio signals in the audio compact disc title.

Before recording the rearranged audio signals, the method further includes steps of recording a compact disc identifying code in the audio compact disc title for representing the relatively high density format of the compact disc title, and recording a plurality of song identifying codes each of which represents a song. Certainly, if there are still some free sectors after all audio signals are stored in required audio sectors of a track, the method further includes a step of inserting a plurality of dummy codes among the specific audio signals for maintaining a constant decompressing rate of a compact disc player.

Figure 4:
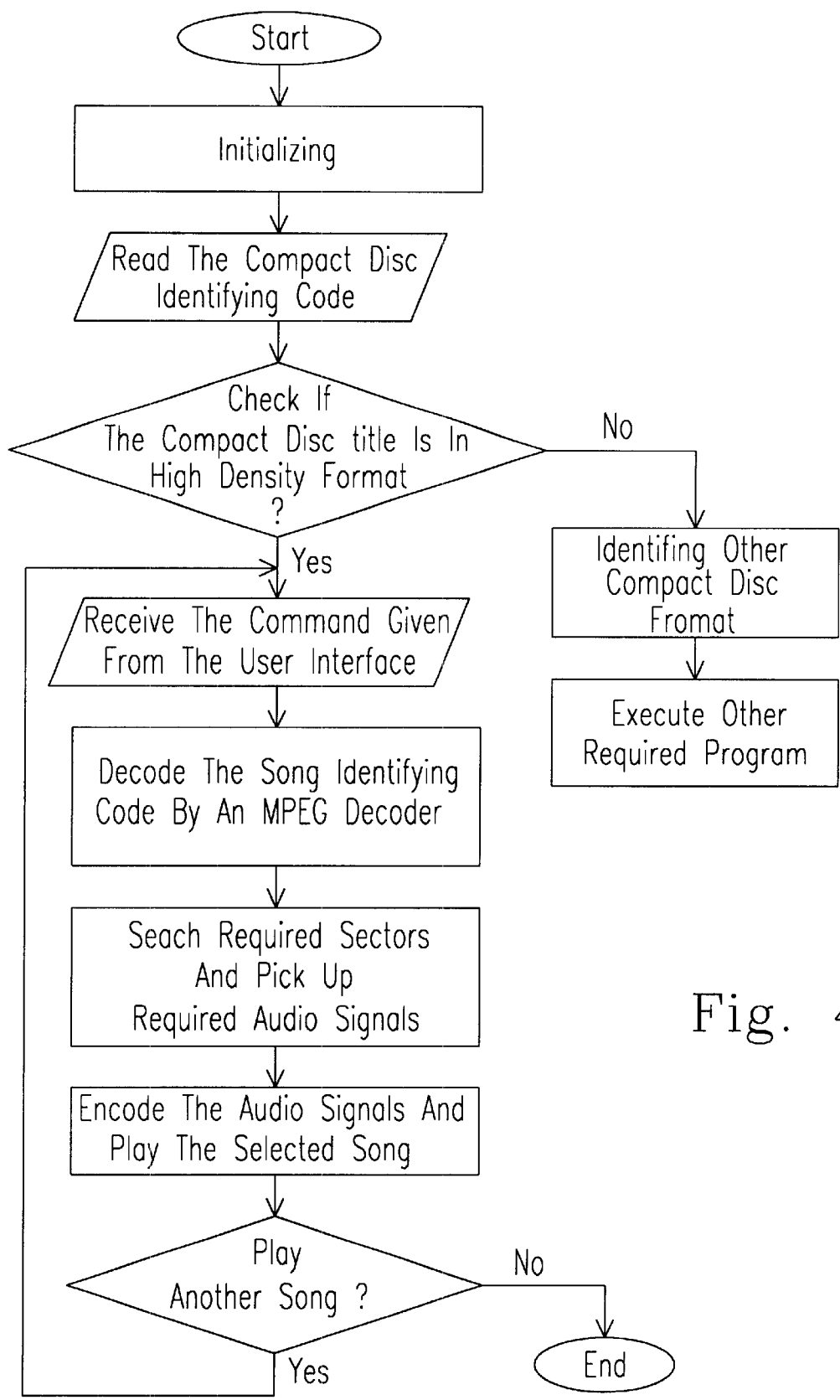
FIG. 4 is a flowchart showing how a compact disc player plays the audio compact disc title with a high density format for a preferred embodiment of the present invention.

Please refer to FIG. 4 showing how a compact disc player plays the audio compact disc title with a high density format in a preferred embodiment of the present invention. As shown in FIG. 4, firstly, the microprocessor initializes a compact disc drive and a MPEG 1 decoder. Secondly, the microprocessor drives the pick-up head to read the compact disc identifying code from the system identification column in INFO.VCD file stored in the first track of the audio compact disc title. If an 8-byte character string $HD_{13}$ AUDIO representing an audio compact disc title with a high density format is read, the microprocessor will execute a required sub-program. If not, the microprocessor will identify other compact disc format and then execute other required sub-program. After identifying the compact disc format, the microprocessor will wait for receiving a command given from the user interface. When the microprocessor receives a command given from the user interface to play a specific song, the microprocessor will drive the MPEG 1 decoder to decode the song identifying code corresponding to the song and move the pick-up head to required sectors in order to pick up required audio signals. The MPEG 1 decoder decodes the audio signals picked up by the pick-up head to be played. At the same time, the microprocessor detects if there is a new command given from the user interface at any time. If there is a new command for playing another song or ending the play mode, the microprocessor will repeat all steps for playing a new selected song or ending the operation.

In accordance with the above-described, the audio compact disc title with a high density format can increase the capacity for storing audio signals and eliminate the troubles of changing the compact disc frequently. Furthermore, there is no need to buy a compact disc player with loader for three or five discs.

While the present invention has been explained in relation to its preferred embodiment, it is to be understood that various modification thereof will be apparent to those skilled in the art upon reading this specification. Therefore, it is to be understood that the invention disclosed herein is intended to cover all such modifications as fall within the scope of the appended claims.

What is claimed is:

1. An audio compact disc title with a high density format adapted to be used in a compact disc player, comprising:

a plurality of tracks, said tracks having a plurality of audio sectors for storing audio data, wherein said audio data is divided into a plurality of audio signals alternately stored in said audio sectors and includes a plurality of songs, each of which has a corresponding song identifying code for representing each said song; and a compact disc identifying code for representing said relatively high density format of said audio compact disc title to be read by said compact disc player, wherein said song identifying code is stored in a stream_id of said audio compact disc title, and said stream_id is compose of 8-bit codes so that a maximum number of said song identifying codes is 255.

2. The audio compact disc title according to claim 1 wherein said audio data is encoded in an MPEG 1 audio compressing form.

3. The audio compact disc title according to claim 1 wherein each of said plurality of tracks includes said plurality of audio sectors, specific adjacent ones of which respectively store therein audio signals of same sequence order of said songs.

4. The audio compact disc title according to claim 1 wherein each of said plurality of tracks includes said plurality of audio sectors, respective ones of which respectively store therein audio signals of a specific song.

5. The audio compact disc title according to claim 1 wherein said song identifying code is stored in respective sectors.

6. The audio compact disc title according to claim 1 wherein said compact disc identifying code is an 8-byte code stored in a system identification column of an INFO.VCD file in said audio compact disc title.

7. The audio compact disc title according to claim 1 wherein said audio signals stored in said audio sector have the same compression ratio.

8. The audio compact disc title according to claim 1 wherein there are a plurality of audio dummy codes stored in specific audio sectors for maintaining a constant reading rate of said compact disc player.

9. An audio compact disc title with a high density format adapted to be used in a compact disc player, comprising:

a plurality of tracks, said tracks having a plurality of audio sectors for storing audio data, wherein said audio data is divided into a plurality of audio signals alternately stored in said audio sectors; and a compact disc identifying code for representing said relatively high density format of said audio compact disc title to be read by said compact disc player, wherein said compact disc identifying code is an 8-byte code stored in a system identification column of an INFO.VCD file in said audio compact disc title.

* * * * *